Connie M. McCormick
INVENTOR.

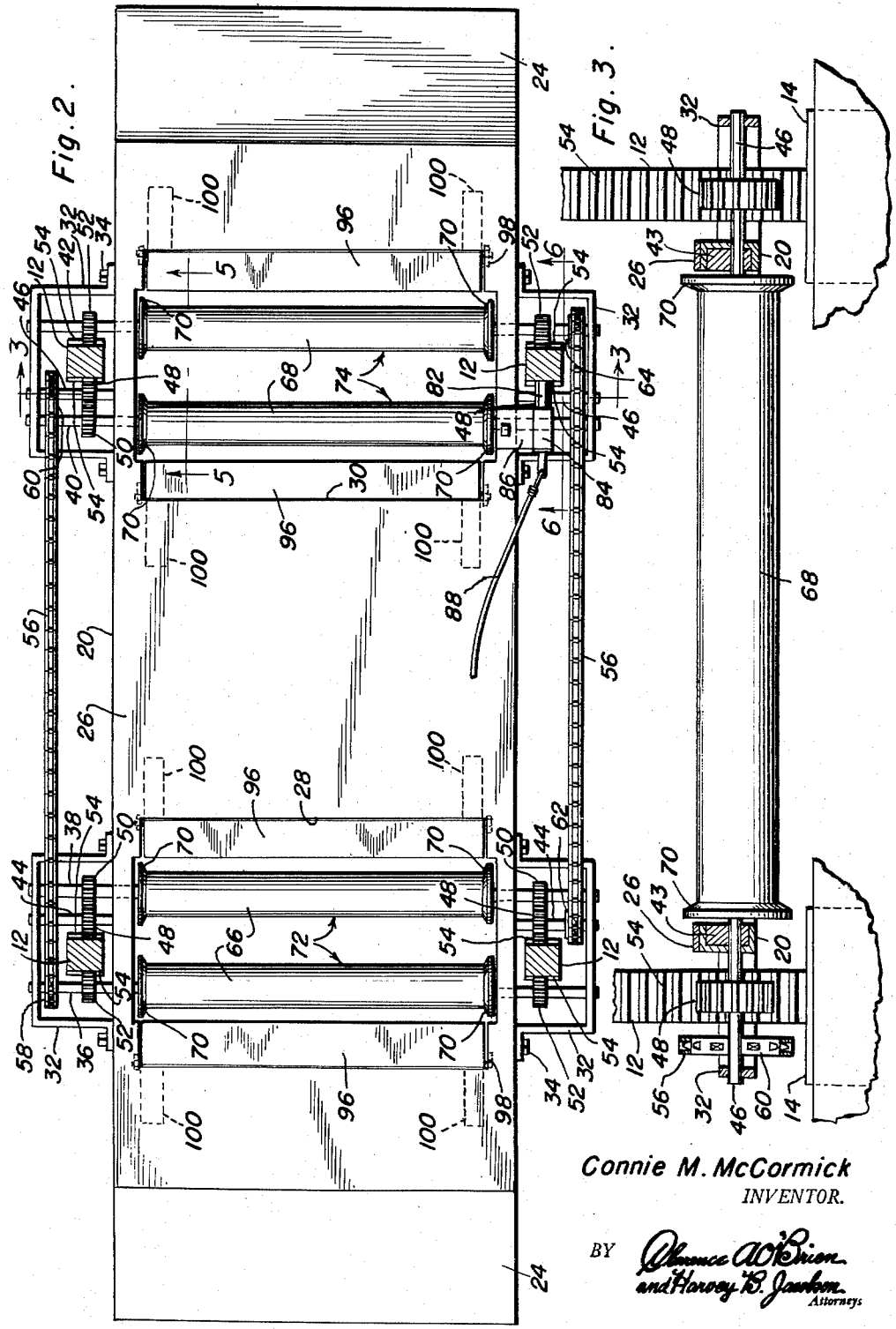
Dec. 25, 1951   C. M. McCORMICK   2,579,688
VEHICLE HOIST
Filed June 18, 1948   3 Sheets-Sheet 2
Connie M. McCormick
INVENTOR.

Dec. 25, 1951   C. M. McCORMICK   2,579,688
VEHICLE HOIST
Filed June 18, 1948   3 Sheets-Sheet 3
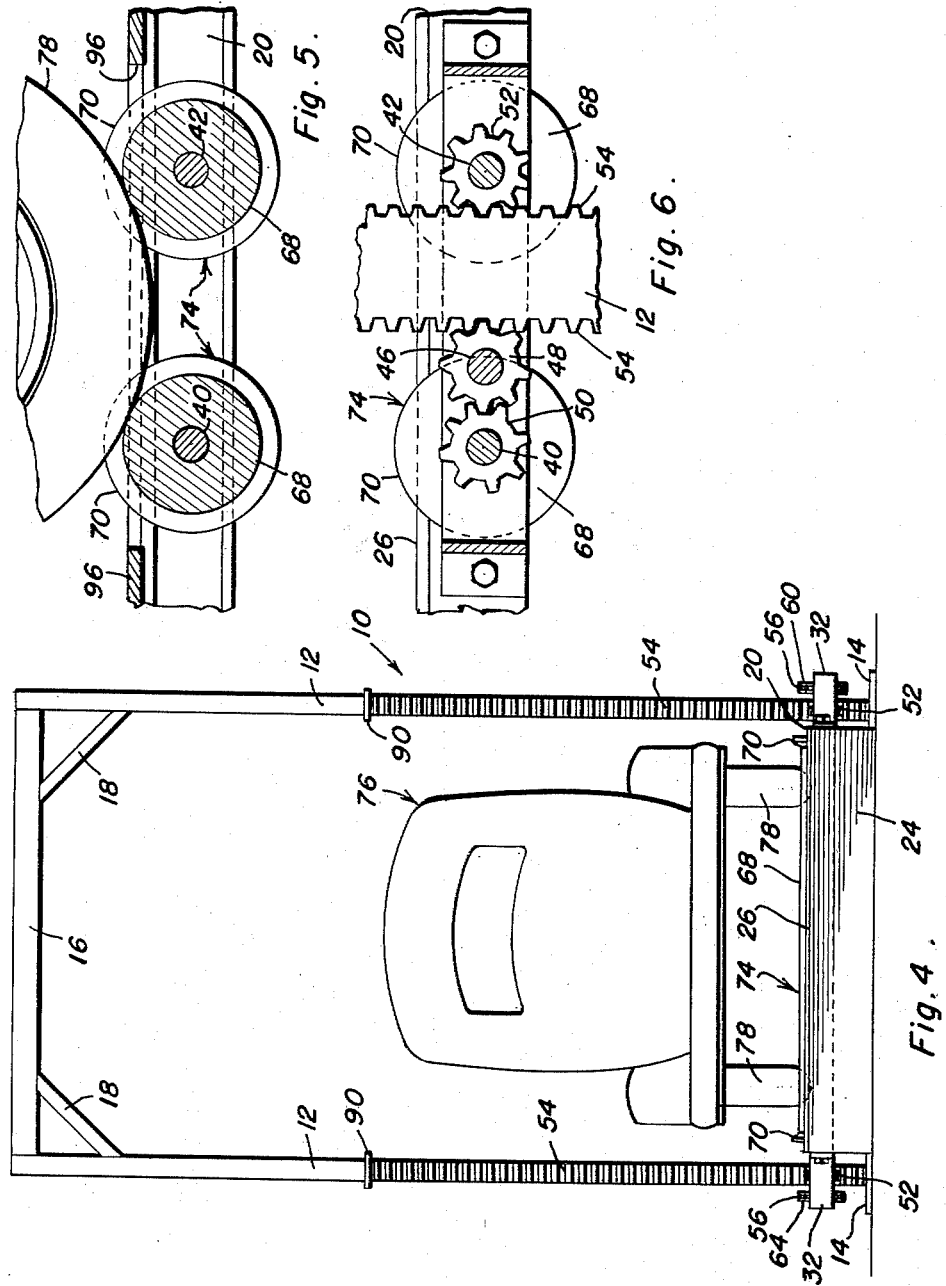
Connie M. McCormick
INVENTOR.

Patented Dec. 25, 1951

2,579,688

UNITED STATES PATENT OFFICE 2,579,688

VEHICLE HOIST

Connie M. McCormick, Hialeah, Fla.

Application June 18, 1948, Serial No. 33,848

1 Claim. (Cl. 187—19)

This invention relates to new and useful improvements and structural refinements in hoists, more particularly, hoists for automobiles, trucks and similar vehicles, and the principal object of the invention is to facilitate raising and lowering of the hoist by the operator of the vehicle, without the necessity of such operator leaving the vehicle for the purpose of manipulating the hoist.

This object is achieved by provision of means for raising and lowering the hoist, which means receives its supply of power from the driving wheels of the vehicle, it only being necessary to drive the vehicle on the hoist, whereupon rotation of the vehicle's driving wheels will either raise or lower the hoist as desired.

An obvious application of the invention is in subterranean garages where the vehicle must be lowered from and raised to ground level, or in vehicle storage establishments where vehicles are stored in a superimposed relation, or in service stations where vehicles are raised to an elevated position to facilitate servicing and repair of the under-carriage, and the like.

An important feature of the invention resides in the provision of means whereby the vehicle may be driven on or driven from the hoist from either end of the latter, as desired.

Another feature of the invention lies in the provision of means for releasably locking the hoist in its raised position, so as to prevent the same from being accidentally or unintentionally lowered.

An important advantage of the invention resides in its simplicity of construction and operation, and in its adaptability to installation in comparatively restricted locations.

With the above more important objects and features in view and such other objects and features as may become apparent as the specification proceeds, the invention consists essentially in the arrangement and construction of parts as illustrated in the accompanying drawings, in which:

Figure 2 is a cross sectional view, taken substantially in the plane of the line 2—2 in Figure 1;

Figure 3 is a cross sectional view, taken substantially in the plane of the line 3—3 in Figure 2;

Figure 4 is an end view of the invention;

Figure 5 is a cross sectional view, taken substantially in the plane of the line 5—5 in Figure 2; and Figure 6 is a cross sectional view, taken substantially in the plane of the line 6—6 in Figure 2.

Like characters of reference are employed to designate like parts in the specification and throughout the several views.

Figure 1:
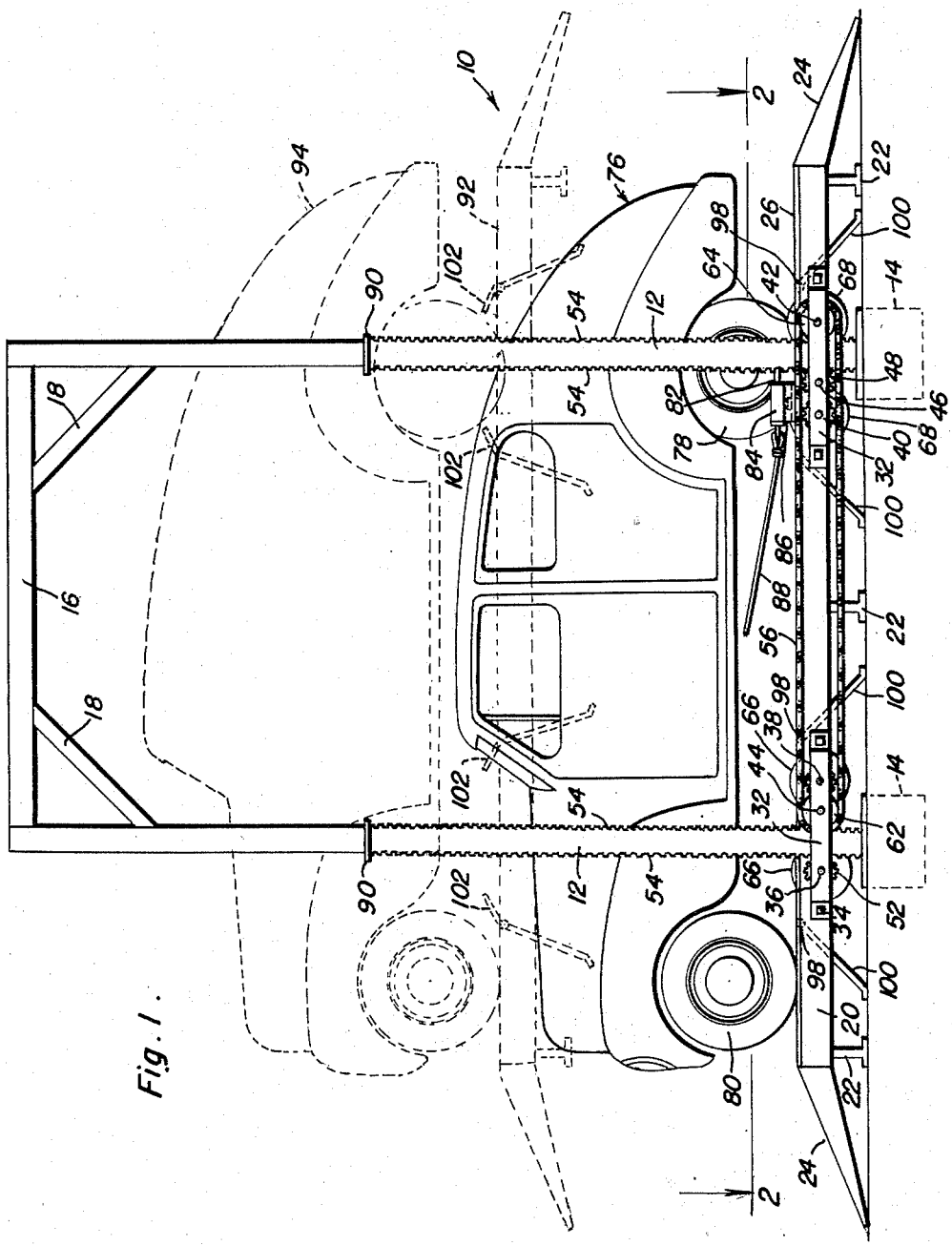
Figure 1 is a side elevational view of the invention.

Referring now to the accompanying drawings in detail, the invention consists of a vehicle hoist designated generally by the reference character 10, the same embodying in its construction a plurality of spaced upright guides 12 having their lower end portions suitably secured in the ground, such as for example, in concrete footings 14, while the upper end portions of the guides 12 are rigidly connected together by suitable cross members and braces 16, 18, respectively.

An elongated carrier 20 is movable vertically between the guides 12, this carrier preferably being of channel construction and being reinforced by transverse I-beams 22, the lower flanges of which are engageable with the ground when the carrier is in its lowermost position, as is best illustrated in Figure 1.

The ends of the carrier 20 are provided with inclined approaches 24 and the carrier is covered with a flat platform 26 which, in turn, is formed with a pair of transversely extending openings 28, 30.

Substantially U-shaped brackets 32 are secured, as at 34, to the sides of the carrier 20, each of these brackets surrounding, so to speak, one of the guides 12, the brackets 32 functioning as bearings for pairs of shafts 36, 38 and 40, 42 which are also rotatably journaled in the carrier 20, as exemplified at 43 in Figure 3.

The brackets 32 also coact with the carrier 20 to provide bearings for pairs of counter-shafts 44, 46, the latter carrying pinions 48 which mesh with further pinions 50 secured to the shafts 38, 40.

Additional pinions 52 are secured to the shafts 36, 42 and it may be explained at this point that each of the guides 12 is provided at the relatively opposite sides or faces thereof with a pair of toothed racks, as indicated at 54. Obviously, these racks may be formed integrally with the guides, or alternatively, they may be secured thereto in any desired manner.

In any event, the pinions 48, 52 constantly engage the racks 54 on the various guides, and it will be readily apparent from the foregoing that when the various shafts 36, 38, 46, or 40, 42, 44 are simultaneously rotated in one direction or the other, the carrier 20 will be caused to rise or fall by virtue of the pinions 48, 52 engaging the racks 54.

Simultaneous rotation of the shafts 36, 38 and 44 with the shafts 40, 42 and 46 is assured by means of endless chain drives 56 provided at both sides of the carrier, the chain on one side of the carrier passing over sprocket wheels 58, 60 secured to the shafts 36, 46, respectively, while the chain on the remaining side of the carrier passes over similar sprockets 62, 64 secured to the shafts 44, 42, respectively, substantially as shown. These means for simultaneously rotating the several shafts facilitate raising and lowering of the carrier 20 in a well balanced manner, that is, evenly with respect to each of the guides 12.

A pair of rollers 66 are secured to the shafts 36, 38, while a further pair of rollers 68 are secured to the shafts 40, 42. It is to be noted that the rollers 66, 68 are disposed in the aforementioned openings 28, 30, respectively, of the platform 26, and that each roller is provided at both ends thereof with guard flanges 70. Moreover, the rollers in each pair are disposed in a spaced parallel relation, and the rollers 66 coact together to provide what may be collectively referred to as a cradle 72, while the rollers 68 provide a similar cradle 74.

The general reference character 76 designates a conventional vehicle such as an automobile, or the like, provided with a pair of driving wheels 78 and a pair of non-driven wheels 80. The vehicle 76 is receivable on the platform 26 of the carrier 20 in such manner that the driving wheels 78 are seated in either one of the cradles 72, 74, while its non-driven wheels 80 rest upon the platform 26.

The advantage resulting from the provision of the two cradles 72, 74 can be readily appreciated, inasmuch as the vehicle 76 may be driven on the carrier 20 from either end, as will be clearly apparent.

In any event, when the invention is placed in use, the vehicle is driven forwardly on the carrier 20 with its driving wheels 78 engaging one of the cradles 72 or 74, while its non-driven wheels 80 rest upon the platform 26, substantially as shown in Figure 1. Thereupon, rotation of the driving wheels 78 is reversed, and it will be observed that matters are so arranged that when the engine of the vehicle rotates the driving wheels 78 in reverse, these driving wheels, by frictionally engaging the rollers of the cradle, will rotate the pinions 50, 52 in such direction that the entire carrier 20, together with the vehicle, will travel upwardly on the guides 12.

The engine of the vehicle may be stopped and the brakes applied to the driving wheels 78 (or the engine left in gear) and the wheels 78, by frictionally engaging the rollers of the cradle, will effectively retain the hoist in any desired position above ground.

When it is desired to lower the hoist, it is only necessary to drive the wheels 78 by the engine of the vehicle in the forward direction, and when the cradle 20 ultimately reaches its lowermost position, further downward travel thereof will not be possible and as a result, the vehicle 76 may be driven off the carrier 20 by simply continuing forward rotation of the wheels 78.

It is to be noted that a spring-pressed plunger 82 is slidably mounted in a housing 84 secured by a bracket 86 to the platform 26, the plunger 82 being releasably engageable with the teeth of one of the aforementioned racks 54 and an actuating rope or cable 88 being connected to the plunger, as indicated in Figures 1 and 2. The plunger 82 will not only effectively retain the carrier 20 in any desired elevated position, thus functioning as a safety measure for preventing lowering of the carrier through inadvertence or accident, but the plunger 82 will also prevent the carrier from traveling upwardly from its lowermost position. This latter feature is particularly intended for restraining the upward movement of the carrier when the vehicle 76 is to be "backed off" the carrier, without actually raising the same.

Needless to say, the actuating cable or rope 88 may be conveniently grasped by the operator of the vehicle 76, so as to prevent the plunger 82 from engaging the associated rack 54 while the carrier 20 is being raised or lowered.

It should be also explained that suitable stops 90 may be provided on the guides 12 at the upper ends of the racks 54, so as to prevent excessive travel of the carrier 20 in an upward direction.

An elevated position of the carrier 20 and vehicle 76 is indicated in Figure 1 by the phantom lines 92, 94, respectively, as will be clearly apparent.

Finally, to prevent the possibility of the vehicle 76 becoming dislodged from either of the two cradles 72, 74, pairs of projectable and retractible guard plates 96 are pivoted, as at 98, at the edges of the openings 28, 30 adjacent the cradles 72, 74 respectively, the plates 96 being provided with downwardly projecting limbs or arms 100 which are engageable with the ground when the carrier 20 is in its lowermost position, thereby retaining the guards 96 substantially in the plane of the platform 26, so that the vehicle 76 may be driven on the platform without interference. However, while the carrier 20 is being raised, the arms 100 will become disengaged from the ground, and by virtue of gravity, these arms will be lowered, thus raising the guards 96 to their projected positions shown at 102 (see Fig. 1) whereby longitudinal movement of the vehicle will be prevented.

Moreover, excessive lateral shifting of the vehicle on the rollers 66, 68 will be prevented by the flanges 70, as will be clearly apparent.

It is believed that the advantages and use of the invention will be clearly understood from the foregoing disclosure, and accordingly, further description thereof at this point is deemed unnecessary.

Having described the invention, what is claimed as new is:

In a vehicle hoist, the combination of two longitudinally spaced pairs of transversely spaced upright guides, an elongated platform movable vertically between said guides and provided at least in one end portion thereof with transversely extending opening, two longitudinally spaced pairs of transversely spaced brackets secured to said platform and embracing the respective guides, a pair of toothed racks provided on opposite sides of each guide, two pairs of shafts extending transversely of said platform into said brackets at the opposite sides of the respective pairs of guides, a pair of rollers secured to one pair of said shafts and disposed in said opening for driving engagement by wheels of a vehicle on said platform, a pair of pinions provided on each of said shafts, the pinions on one shaft in each pair meshing with one rack on each guide, idler pinions mounted in each bracket and meshing with the pinions on the remaining shaft in each pair and with the remaining rack on each guide, and chain drives provided at opposite sides of said platform and operatively connecting one of the shafts in each pair to the idler pinion of the other pair.

CONNIE M. McCORMICK.

REFERENCES CITED

The following references are of record in the file of this patent:

UNITED STATES PATENTS

| Number | Name | Date |
|---|---|---|
| 1,660,465 | Withrow | Feb. 28, 1928 |
| 2,059,059 | Thompson | Oct. 27, 1936 |
| 2,222,111 | McCarthy | Nov. 19, 1940 |
| 2,233,055 | Kennedy | Feb. 25, 1941 |

FOREIGN PATENTS

| Number | Country | Date |
|---|---|---|
| 442,905 | Great Britain | Feb. 18, 1936 |
| 617,708 | Germany | Apr. 3, 1935 |